(12) United States Patent
Hisamatsu et al.

(10) Patent No.: US 9,272,742 B2
(45) Date of Patent: Mar. 1, 2016

(54) CRAWLER BELT LINK AND CRAWLER BELT APPARATUS

(71) Applicants: Kenichi Hisamatsu, Hirakata (JP); Naoaki Kita, Hirakata (JP)

(72) Inventors: Kenichi Hisamatsu, Hirakata (JP); Naoaki Kita, Hirakata (JP)

(73) Assignee: KOMATSU LTD., Tokyo (JP)

(*) Notice: Subject to any disclaimer, the term of this patent is extended or adjusted under 35 U.S.C. 154(b) by 0 days.

(21) Appl. No.: 14/353,651

(22) PCT Filed: Dec. 26, 2012

(86) PCT No.: PCT/JP2012/083580
§ 371 (c)(1),
(2) Date: Apr. 23, 2014

(87) PCT Pub. No.: WO2014/033971
PCT Pub. Date: Mar. 6, 2014

(65) Prior Publication Data
US 2014/0292068 A1    Oct. 2, 2014

(30) Foreign Application Priority Data

Sep. 3, 2012 (JP) ................................ 2012-192990

(51) Int. Cl.
*B62D 55/21* (2006.01)
*B62D 55/14* (2006.01)
*B62D 55/28* (2006.01)

(52) U.S. Cl.
CPC ............... *B62D 55/21* (2013.01); *B62D 55/14* (2013.01); *B62D 55/28* (2013.01)

(58) Field of Classification Search
CPC ...... B62D 55/20; B62D 55/205; B62D 55/21; B62D 55/28
USPC .................. 305/102, 103, 104, 106, 198, 201
See application file for complete search history.

(56) References Cited

U.S. PATENT DOCUMENTS

| | | | |
|---|---|---|---|
| 4,457,565 A | 7/1984 | Bissi et al. | |
| 5,172,965 A * | 12/1992 | Taft | 305/187 |
| 5,183,318 A * | 2/1993 | Taft et al. | 305/185 |
| 5,201,171 A | 4/1993 | Anderton et al. | |
| 6,109,706 A * | 8/2000 | Oertley | 305/202 |
| 6,354,679 B1 * | 3/2002 | Maguire et al. | 305/201 |
| 8,851,582 B2 * | 10/2014 | Grenzi | 305/201 |

(Continued)

FOREIGN PATENT DOCUMENTS

| | | |
|---|---|---|
| CN | 1417075 A | 5/2003 |
| CN | 102421661 A | 4/2012 |

(Continued)

*Primary Examiner* — Kip T Kotter
(74) *Attorney, Agent, or Firm* — Drinker Biddle & Reath LLP

(57) ABSTRACT

A crawler belt link includes a center portion, one end portion located on one end side of the center portion, and the other end portion located on the other end side of the center portion. In a second surface, the center portion has a first portion of a rail surface, the one end portion has a second portion of the rail surface, and the other end portion has a third portion of the rail surface. A first outer circumferential portion reaching the second portion of the rail surface is located closer to a second side portion with respect to a bushing hole surrounding portion. Accordingly, a crawler belt link and a crawler belt apparatus can be implemented, by which wear of the rail surface above a bushing hole can be suppressed while maintaining the width of the crawler belt link to be relatively small.

5 Claims, 6 Drawing Sheets

(56) References Cited

U.S. PATENT DOCUMENTS

| | | |
|---|---|---|
| 2001/0003895 A1* | 6/2001 | Bedford et al. ............... 59/7 |
| 2002/0062638 A1* | 5/2002 | Bedford et al. ............... 59/7 |
| 2003/0000747 A1 | 1/2003 | Sugiyama et al. |
| 2003/0090151 A1 | 5/2003 | Takeno et al. |
| 2005/0040708 A1 | 2/2005 | Yamamoto et al. |
| 2006/0043791 A1 | 3/2006 | Sho et al. |
| 2010/0270856 A1 | 10/2010 | Maeda et al. |
| 2012/0068530 A1 | 3/2012 | Grenzi |

FOREIGN PATENT DOCUMENTS

| | | |
|---|---|---|
| DE | 601 32 560 T2 | 1/2009 |
| JP | 2004-249973 A | 9/2004 |
| JP | 2006-089023 A | 4/2006 |
| WO | WO-2009/101836 A1 | 8/2009 |
| WO | WO-2010/109277 A1 | 9/2010 |

* cited by examiner

CRAWLER BELT LINK AND CRAWLER BELT APPARATUS

TECHNICAL FIELD

The present invention relates to a crawler belt link and a crawler belt apparatus.

BACKGROUND ART

A track-type work vehicle such as a hydraulic excavator includes a lower traveling unit, an upper revolving unit, and a work implement coupled to this upper revolving unit. The above-described lower traveling unit has a sprocket wheel, an idler tumbler, a roller, a crawler belt apparatus, and the like.

Generally, the crawler belt apparatus is configured by coupling a plurality of crawler belt links by a pin and a bushing in an endless manner (in an oval shape) and attaching a track shoe plate to the plurality of crawler belt links. The crawler belt apparatus is wound around the idler tumbler and the sprocket wheel, and configured such that it can be driven to rotate by engaging sprocket teeth with the above-mentioned bushing to rotate the sprocket wheel.

The above-described crawler belt link has a rail surface opposite to the surface having the track shoe plate mounted thereon. On this rail surface, the rollers and the idler tumbler roll. Such a crawler belt link is, for example, disclosed in Japanese Patent Laying-Open No. 2006-89023 (see PTD 1), WO2009/101836 (see PTD 2), and the like.

Japanese Patent Laying-Open No. 2006-89023 discloses that the hardness of the rail surface of the crawler belt link is partially changed in order to reduce occurrence of level differences on the rail surface that are caused by wear due to rolling of the rollers. Furthermore, WO2009/101836 discloses that a roller is divided in the axial direction in order to reduce uneven wear of the rail surface of the crawler belt link.

CITATION LIST

Patent Document

PTD 1: Japanese Patent Laying-Open No. 2006-89023
PTD 2: WO2009/101836

SUMMARY OF INVENTION

Technical Problem

However, also in the crawler belt link disclosed in each of the above-mentioned two documents, the width of the rail surface above a bushing hole through which a bushing is inserted (the dimension of the bushing or the pin in the axial direction) is narrower than the width of the rail surface above a pin hole through which a pin is inserted. Accordingly, when rollers and the like roll while coming into contact with the rail surface, the contact surface pressure between the crawler belt link and the roller is increased on the rail surface above the bushing hole. Consequently, the rail surface above the bushing hole becomes more likely to wear.

When the width of the rail surface above the bushing hole is increased simply in the configuration of the crawler belt link disclosed in each of the above-mentioned two documents in order to suppress wear of the rail surface above the bushing hole described above, the width of the crawler belt link is increased. In this case, there occurs a problem that the width of one pair of roller guards (roller guides) in the width direction is increased to cause an increase in size of the apparatus, or the crawler belt link interferes with an idler tumbler or a sprocket wheel.

Furthermore, when the width of the rail surface above the bushing hole is increased simply without increasing the width of the crawler belt link, the width of the rail surface above the pin hole is decreased. In this case, the configuration of the crawler belt link disclosed in each of the above-mentioned two documents causes a problem that the size of the pin press-fit portion is also reduced in accordance with a decrease in width of the rail surface above the pin hole, so that the force of the crawler belt link holding the pin is decreased.

The present invention has been made in light of the above-described problems. An object of the present invention is to provide a crawler belt link and a crawler belt apparatus, by which wear of the rail surface above the bushing hole can be suppressed while maintaining the width of the crawler belt link to be relatively narrow.

Solution to Problem

A crawler belt link of the present invention includes a first surface having a track shoe plate attachment portion; a second surface facing the first surface and having a rail surface; and first and second side portions extending in a direction that intersects the first and second surfaces and facing each other. The crawler belt link has a center portion, one end portion and the other end portion. The center portion is provided with the track shoe plate attachment portion and has a first portion of the rail surface. The one end portion is located on one end side of the center portion, has a second portion of the rail surface and is disposed to be shifted toward the first side portion with respect to the center portion. The other end portion is located on the other end side of the center portion, has a third portion of the rail surface and is disposed to be shifted toward the second side portion with respect to the center portion. The one end portion is provided with a first through hole extending through the one end portion from the first side portion toward the second side portion. The other end portion is provided with a second through hole extending through the other end portion from the first side portion toward the second side portion and having a portion smaller in diameter than the first through hole. The one end portion includes a first through hole surrounding portion surrounding the first through hole in the second side portion, and a first outer circumferential portion extending from an outer circumference of the first through hole surrounding portion to the second portion of the rail surface. The first outer circumferential portion is located closer to the second side portion with respect to the first through hole surrounding portion.

According to the crawler belt link of the present invention, the first outer circumferential portion reaching the second portion of the rail surface is located closer to the second side portion with respect to the first through hole surrounding portion. Accordingly, the second portion of the rail surface can be enlarged toward the second side portion while maintaining the width between the first and second side portions of the crawler belt link. Consequently, it becomes possible to reduce the contact surface pressure in the second portion of the rail surface at the time when the roller rolls while coming into contact with the rail surface, thereby allowing suppression of wear of the second portion in the rail surface.

In the above-described crawler belt link, the other end portion includes a second through hole surrounding portion surrounding the second through hole in the first side portion and a second outer circumferential portion extending from an outer circumference of the second through hole surrounding portion to the third portion of the rail surface. The second through hole surrounding portion is located closer to the first side portion with respect to the second outer circumferential portion.

Accordingly, the thickness of the second through hole surrounding portion in the width direction can be increased toward the first side portion. This allows an increase in the insertion length of the member inserted into the second through hole, so that the force of the crawler belt link holding the member to be inserted can be increased.

Furthermore, the second through hole surrounding portion is located closer to the first side portion with respect to the second outer circumferential portion, and thereby formed in a convex shape with respect to the second outer circumferential portion. Also, the first through hole surrounding portion is located closer to the first side portion with respect to the first outer circumferential portion, and thereby formed in a concave shape with respect to the first outer circumferential portion. Accordingly, when the second side portion at the one end portion and the first side portion at the other end portion are put together in order to couple the crawler belt links to each other, the second through hole surrounding portion in a convex shape can be fitted into the first through hole surrounding portion in a concave shape.

In the above-described crawler belt link, a width between the first and second side portions in the second surface provided with the second portion of the rail surface is greater than a width between the first and second side portions in the first through hole surrounding portion in a portion of the first through hole located closest to the second surface.

Consequently, the second surface can be ensured to have a relatively large width while the second portion of the rail surface can also be ensured to have a relatively large width.

In the above-described crawler belt link, the width between the first and second side portions in the second surface provided with the second portion of the rail surface and a width between the first and second side portions in the second surface provided with the third portion of the rail surface have the same dimension.

Accordingly, the second and third portions of the rail surface can be formed to have the same width. Consequently, it becomes possible to reduce the contact surface pressure in each of the second and third portions of the rail surface at the time when the roller rolls while coming into contact with the rail surface, thereby allowing suppression of wear of the second and third portions.

A crawler belt apparatus of the present invention includes a plurality of crawler belt links according to any one described above, a bushing in a cylindrical shape, a coupling pin, and a plurality of track shoe plates. The bushing in a cylindrical shape is inserted into the first through hole of one crawler belt link of one and the other crawler belt links included in the plurality of crawler belt links to be fixed to the one crawler belt link. The coupling pin is inserted into the first through hole of the one crawler belt link by being inserted into the bushing, and is fixed to the other crawler belt link by being inserted into the second through hole of the other crawler belt link. The plurality of track shoe plates each are attached to the track shoe plate attachment portion of each of the plurality of crawler belt links.

According to the crawler belt apparatus of the present invention, since wear of the second portion of the rail surface can be suppressed while maintaining the width between the first and second side portions of the crawler belt link, it is not necessary to change the designs of other components such as a bushing, a coupling pin and a track shoe plate for suppressing wear of the rail surface.

Advantageous Effects of Invention

According to the present invention as described above, since the first outer circumferential portion reaching the second portion of the rail surface is located closer to the second side portion with respect to the first through hole surrounding portion, the second portion of the rail surface can be enlarged toward the second side portion while maintaining the width between the first and second side portions of the crawler belt link, thereby allowing suppression of wear of the second portion of the rail surface.

DESCRIPTION OF EMBODIMENTS

The embodiments of the present invention will be hereinafter described with reference to the accompanying drawings.

First, the configuration of a hydraulic excavator will be described as an example of a track-type work vehicle to which the idea of the present invention is applicable. It is to be noted that the present invention is applicable also to a track-type work vehicle such as a bulldozer other than a hydraulic excavator described below.

Figure 1:
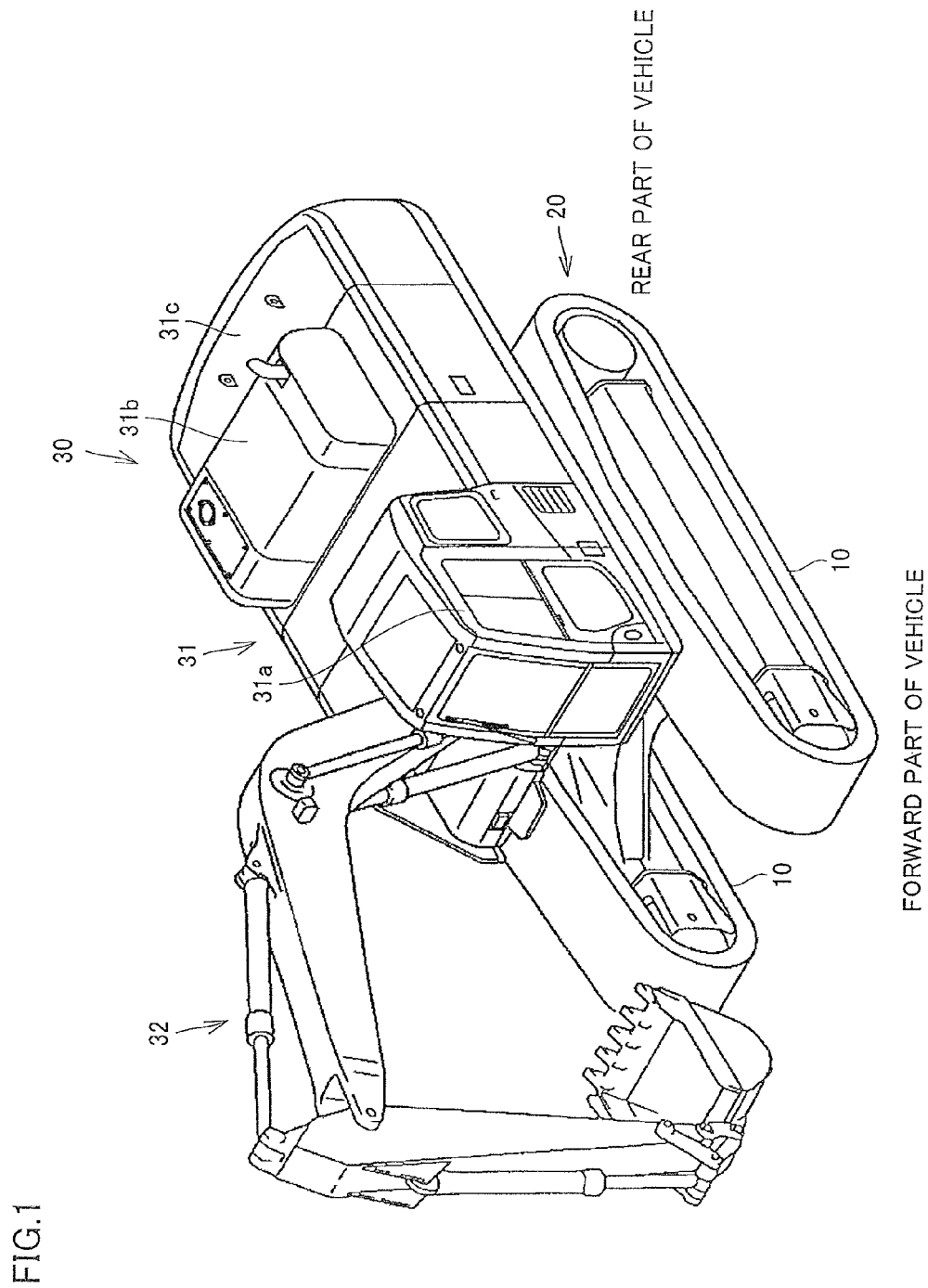
FIG. 1 is a schematic perspective view showing the configuration of a hydraulic excavator as an example of a track-type work vehicle using a crawler belt link or a crawler belt apparatus in one embodiment of the present invention.

Referring to FIG. 1, a track-type work vehicle (for example, a hydraulic excavator) 30 mainly includes a lower traveling unit 20, an upper revolving unit 31, and a work implement 32. Lower traveling unit 20 and upper revolving unit 31 form a main body of the work vehicle.

Lower traveling unit 20 has a pair of right and left crawler belt apparatuses 10. Track-type work vehicle 30 is configured such that it can run in a self-propelled manner by driving rotation of the pair of right and left crawler belt apparatuses 10. The configuration of this lower traveling unit 20 will be described later in detail.

Upper revolving unit 31 is placed such that it can freely revolve with respect to lower traveling unit 20. This upper revolving unit 31 includes a cab 31a on its forward left side (in a front part of the vehicle), and also includes an engine compartment 31b housing an engine and a counter weight 31c on its rear side (in a rear part of the vehicle). In this case, front and rear/right and left of the vehicle are defined with respect to the operator who sits in cab 31a.

Work implement 32 is pivotally supported on the forward side of upper revolving unit 31 and, for example, includes a boom, an arm, a bucket, hydraulic cylinders, and the like.

Figure 2:
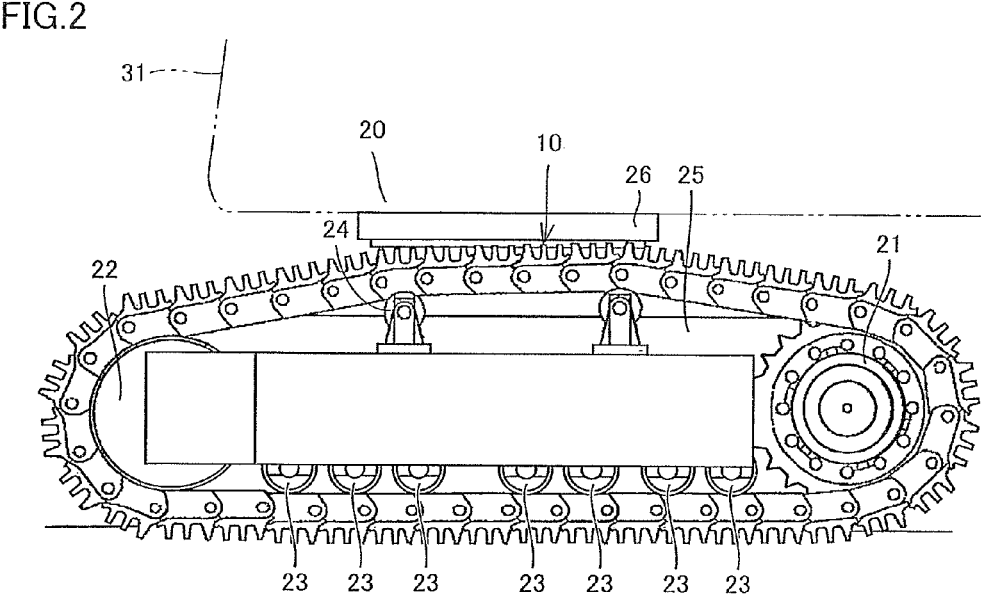
FIG. 2 is a side view schematically showing the configuration of a track-type traveling unit in the track-type work vehicle in FIG. 1.

Referring to FIG. 2, lower traveling unit 20 mainly includes a crawler belt apparatus 10, a driving wheel (sprocket wheel) 21, an idler wheel (idler tumbler) 22, a track roller 23, a carrier roller 24, a track frame 25, and a revolving apparatus 26.

Revolving apparatus 26 is mounted above track frame 25. This revolving apparatus 26 is configured such that it can revolve with respect to track frame 25. Upper revolving unit 31 described above is placed on revolving apparatus 26. Thereby, upper revolving unit 31 is configured such that it can revolve with respect to lower traveling unit 20.

Track frame 25 is provided on each side thereof with a driving wheel 21, an idler wheel 22, a plurality of track rollers 23, and a plurality of carrier rollers 24. Driving wheel 21 is provided, for example, at the rear end of track frame 25 such that it can be driven to rotate. Idler wheel 22 is rotatably provided, for example, at the front end of track frame 25. The plurality of track rollers 23 are rotatably provided on the lower surface side of track frame 25. The plurality of carrier rollers 24 are rotatably provided on the upper surface side of track frame 25.

Crawler belt apparatus 10 is configured in an endless manner (in an oval shape), and wound around driving wheel 21 and idler wheel 22. Furthermore, crawler belt apparatus 10 is supported by the plurality of track rollers 23 and the plurality of carrier rollers 24 that are arranged between driving wheel 21 and idler wheel 22.

Crawler belt apparatus 10 is engaged with driving wheel 21, and configured such that it can be driven to rotate by driving rotation of this driving wheel 21. During driving rotation of crawler belt apparatus 10, each of idler wheel 22, the plurality of track rollers 23 and the plurality of carrier rollers 24 can be driven to rotate while coming into contact with crawler belt apparatus 10.

Figure 3:
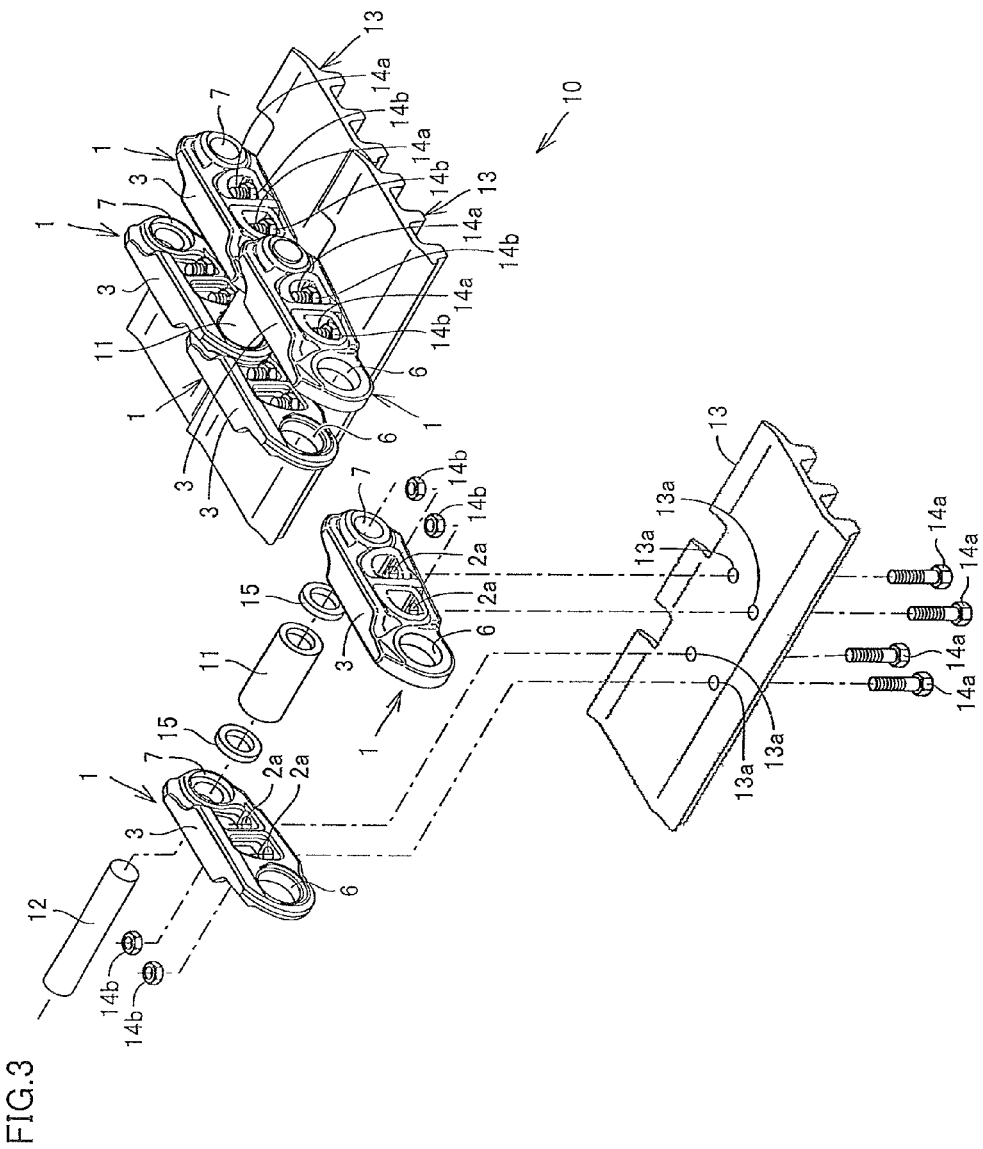
FIG. 3 is a partially exploded perspective view schematically showing the configuration of the crawler belt apparatus included in the track-type traveling unit in FIG. 2.

Referring to FIG. 3, crawler belt apparatus 10 described above mainly includes a crawler belt link 1, a bushing 11, a coupling pin 12, a track shoe plate (shoe plate) 13, track shoe plate attachment members 14a and 14b, and a seal member 15. Crawler belt apparatus 10 is configured in an oval shape by coupling, in an endless manner, a plurality of crawler belt links 1 having track shoe plate 13 attached thereto.

Track shoe plate 13 is attached to crawler belt link 1 by a bolt member 14a and a nut member 14b serving as track shoe plate attachment members 14a and 14b, respectively. Specifically, bolt member 14a is inserted from track shoe plate 13 into a through hole 13a of track shoe plate 13 and a through hole 2a of crawler belt link 1, and screwed in nut member 14b on the crawler belt link 1 side, thereby attaching track shoe plate 13 to crawler belt link 1.

In one crawler belt apparatus 10, a plurality of crawler belt links 1 are arranged in two rows. One crawler belt link 1 and the other crawler belt link 1 located adjacent to each other in the same row are arranged so as to allow communication between bushing hole 6 of one crawler belt link 1 and pin hole 7 of the other crawler belt link 1.

Cylindrical bushing 11 is pressed-fitted into bushing hole 6 of one crawler belt link 1. Coupling pin 12 is inserted into bushing 11, and pressed-fitted into pin hole 7 of the other crawler belt link 1. One crawler belt link 1 and the other crawler belt link 1 arranged in the row direction in this way are coupled to each other.

Furthermore, crawler belt link 1 in the first row is placed on one end side of one bushing 11 and coupling pin 12 as described above while crawler belt link 1 in the second row is placed on the other end side thereof, so that crawler belt links 1 in one row and the other row are coupled to each other. In addition, the configuration of coupling crawler belt links 1 using bushing 11 and coupling pin 12 will be described later in detail with reference to FIG. 6.

Then, the configuration of crawler belt link 1 used for crawler belt apparatus 10 described above will be described with reference to FIGS. 4(A) to 4(E).

Referring to FIGS. 4(A) to 4(E), crawler belt link 1 includes a first surface 2 having a through hole (a track shoe plate attachment portion) 2a and a second surface 3 facing first surface 2 and having a rail surface 3a. Furthermore, crawler belt link 1 has a first side portion 4 and a second side portion 5 extending in the direction that intersects first and second surfaces 2 and 3 and facing each other.

Figure 4:
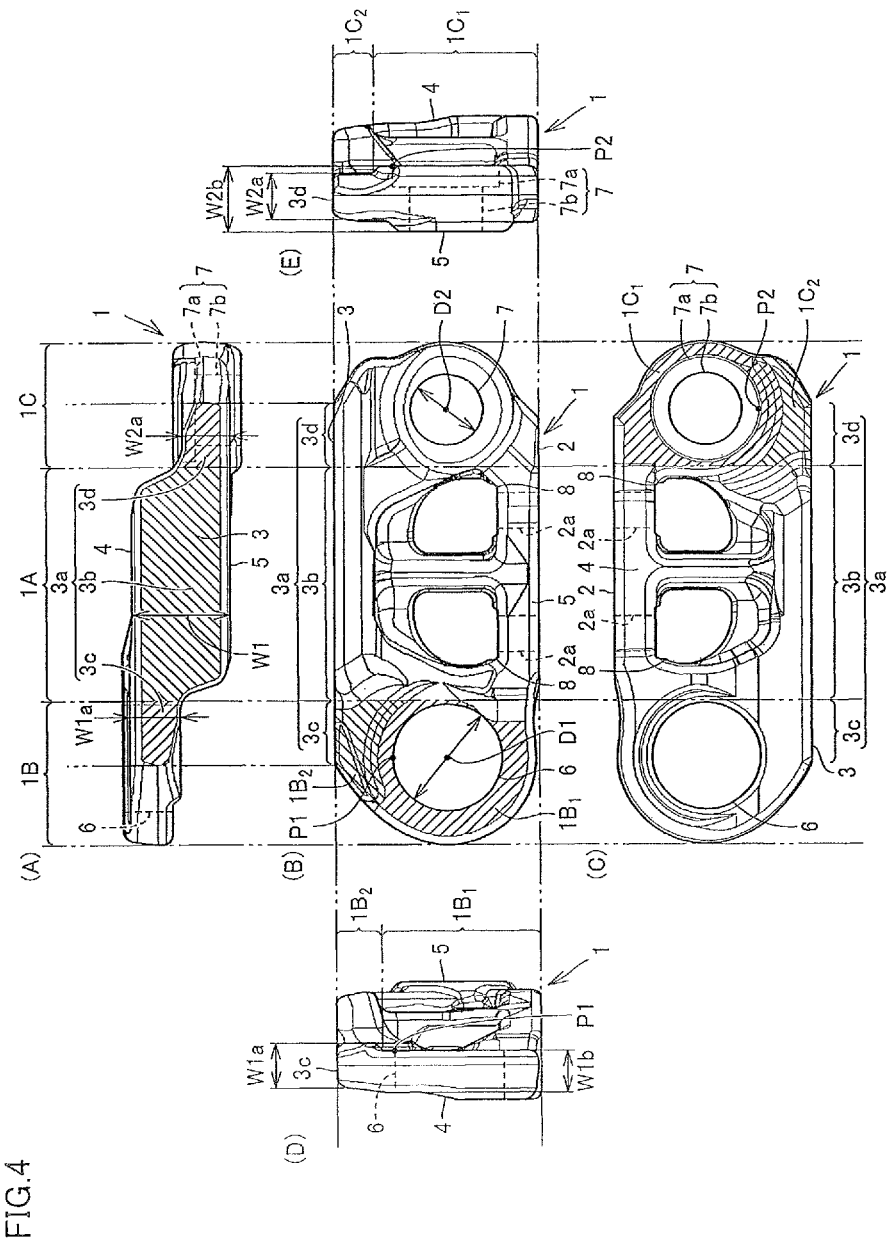
FIG. 4 shows a plan view (A), one side view (B), the other side view (C), a front view (D), and a rear view (E) each schematically showing the configuration of the crawler belt link used for the crawler belt apparatus in FIG. 3.

Referring mainly to FIGS. 4(A), 4(B) and 4(C), crawler belt link 1 has a center portion 1A, one end portion 1B located on one end side of center portion 1A, and the other end portion 1C located on the other end side of center portion 1A.

First surface 2 of center portion 1A is, for example, provided with two through holes 2a so as to extend from first surface 2 to center through hole 8 of crawler belt link 1. Center portion 1A has a first portion 3b of rail surface 3a on second surface 3. This first portion 3b is a main portion of rail surface 3a, that is, a so-called main rail surface.

Referring mainly to FIG. 4(A), one end portion 1B is disposed to be shifted toward first side portion 4 with respect to center portion 1A in a plan view. In other words, second side portion 5 of one end portion 1B is located closer to first side portion 4 with respect to second side portion 5 of center portion 1A in a plan view. Accordingly, in a plan view, second side portion 5 of second surface 3 at one end portion 1B is located closer to first side portion 4 with respect to second side portion 5 of second surface 3 in center portion 1A while first side portion 4 of second surface 3 at one end portion 1B is located on the same straight line as first side portion 4 of second surface 3 in center portion 1A. This one end portion 1B has a second portion 3c of rail surface 3a in second surface 3.

The other end portion 1C is disposed to be shifted toward second side portion 5 with respect to center portion 1A in a plan view. In other words, in a plan view as shown in FIG. 4(A), first side portion 4 of the other end portion 1C is located closer to second side portion 5 with respect to first side portion 4 of center portion 1A. Accordingly, in a plan view, first side portion 4 of second surface 3 at the other end portion 1C is located closer to second side portion 5 with respect to first side portion 4 of second surface 3 in center portion 1A while second side portion 5 of second surface 3 at the other end portion 1C is located on the same straight line as second side portion 5 of second surface 3 in center portion 1A. The other end portion 1C has a third portion 3d of rail surface 3a in second surface 3.

Referring mainly to FIGS. 4(B) and 4(C), one end portion 1B is provided with a bushing hole (first through hole) 6 extending through one end portion 1B from first side portion 4 toward second side portion 5. This bushing hole 6 serves as a hole into which bushing 11 is pressed-fitted.

The other end portion 1C is provided with a pin hole (second through hole) 7 extending through the other end portion 1C from first side portion 4 toward second side portion 5. This pin hole 7 has a large-diameter portion 7a located closer to first side portion 4 and a small-diameter portion 7b located closer to second side portion 5 so as to be in communication with large-diameter portion 7a.

Large-diameter portion 7a is used for inserting the end of bushing 11 and seal member 15. Small-diameter portion 7b is used for pressing-fit and fixing coupling pin 12. Large-diameter portion 7a has a diameter that is approximately equal to or slightly larger than a diameter D1 of bushing hole 6. Small-diameter portion 7b has a diameter D2 that is smaller than diameter D1 of bushing hole 6.

Referring mainly to FIG. 4(B), one end portion 1B has a bushing hole surrounding portion (first through hole surrounding portion) $1B_1$ and a first outer circumferential portion $1B_2$ in second side portion 5. Bushing hole surrounding portion $1B_1$ is a portion surrounding bushing hole 6 in second side portion 5 of one end portion 1B and corresponding to an area with hatched lines rising from right to left in FIG. 4(B). First outer circumferential portion $1B_2$ is a portion in second side portion 5 of one end portion 1B extending from the outer circumference of bushing hole surrounding portion $1B_1$ to second portion 3c of rail surface 3a, and corresponding to an area with hatched lines rising from left to right in FIG. 4(B).

Referring mainly to FIG. 4(D), first outer circumferential portion $1B_2$ is located closer to second side portion 5 with respect to bushing hole surrounding portion $1B_1$ in a front view. Thereby, a width W1a between first side portion 4 and second side portion 5 in a portion of second surface 3 provided with second portion 3c of rail surface 3a is greater than a width W1b between first side portion 4 and second side portion 5 in bushing hole surrounding portion $1B_1$ in a portion P1 of bushing hole 6 located closest to second surface 3.

Referring mainly to FIG. 4(C), the other end portion 1C has a pin hole surrounding portion (second through hole surrounding portion) $1C_1$ and a second outer circumferential portion $1C_2$ in first side portion 4. Pin hole surrounding portion (second through hole surrounding portion) $1C_1$ is a portion surrounding pin hole 7 in first side portion 4 of the other end portion 1C and corresponding to an area with hatched lines rising from right to left in FIG. 4(C). Second outer circumferential portion $1C_2$ is a portion in first side portion 4 of the other end portion 1C that extends from the outer circumference of pin hole surrounding portion $1C_1$ to third portion 3d of rail surface 3a, and that corresponds to an area with hatched lines rising from left to right.

Referring mainly to FIG. 4(E), pin hole surrounding portion $1C_1$ is located closer to first side portion 4 with respect to second outer circumferential portion $1C_2$ in a rear view. Accordingly, a width W2b between first side portion 4 and second side portion 5 in pin hole surrounding portion $1C_1$ in a portion P2 of pin hole 7 located closest to second surface 3 is greater than a width W2a between first side portion 4 and second side portion 5 in a portion of second surface 3 provided with third portion 3d of rail surface 3a.

Referring mainly to FIG. 4(A), width W1a of second surface 3 provided with second portion 3c of rail surface 3a and width W2a of second surface 3 provided with third portion 3d of rail surface 3a have the same dimension.

Figure 5:
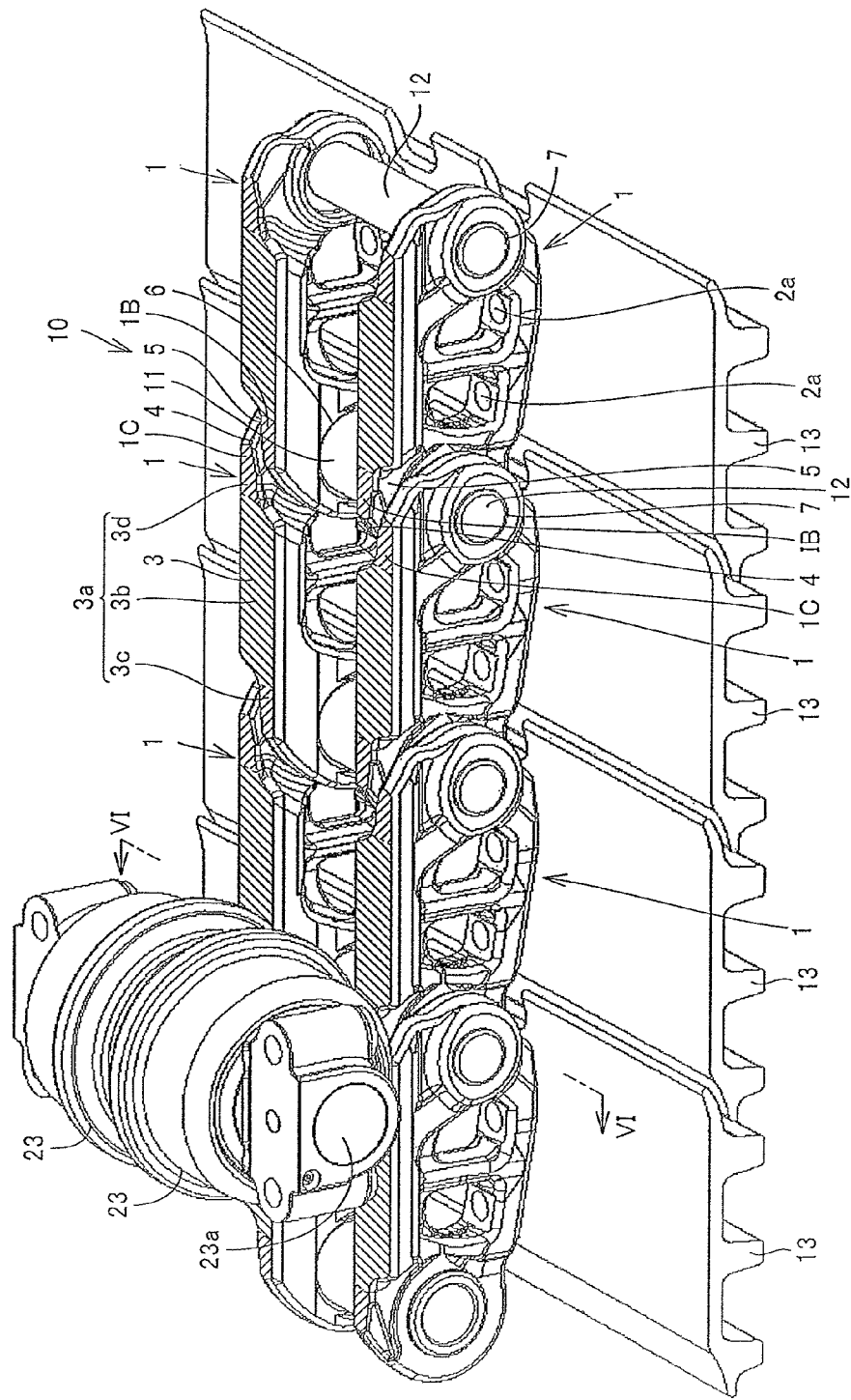
FIG. 5 is a schematic perspective view showing the manner in which a track roller rolls while coming into contact with the crawler belt link of the crawler belt apparatus.

In the above description, rail surface 3a means an area of the surface of crawler belt link 1 on which rollers (track rollers 23 and carrier rollers 24) and idler wheel 22 roll while coming into contact therewith. FIG. 5 shows the manner in which, for example, track rollers 23 rolls on rail surface 3a of crawler belt link 1. Referring to this FIG. 5, for example, track roller 23 can roll on rail surface 3a while rotating about a shaft 23a by coming into contact with rail surface 3a of crawler belt link 1. As with track roller 23, idler wheel 22 and carrier roller 24 can also roll while coming into contact with rail surface 3a of crawler belt link 1.

In these FIGS. 5 and 4(A), only the flat surface portion of second surface 3 is hatched as rail surface 3a (first portion 3b with hatched lines rising from left to right; and second portion 3c and third portion 3d each with hatched lines rising from right to left). Rail surface 3a however may include not only the flat surface portion but also a curved surface around this flat surface. Furthermore, the portion hatched as rail surface 3a does not have to be a flat surface, but may be a curved surface that is slightly rounded.

Then, the configuration of coupling crawler belt links 1 to each other using bushing 11 and coupling pin 12 will be hereinafter described in detail with reference to FIG. 6.

Figure 6:
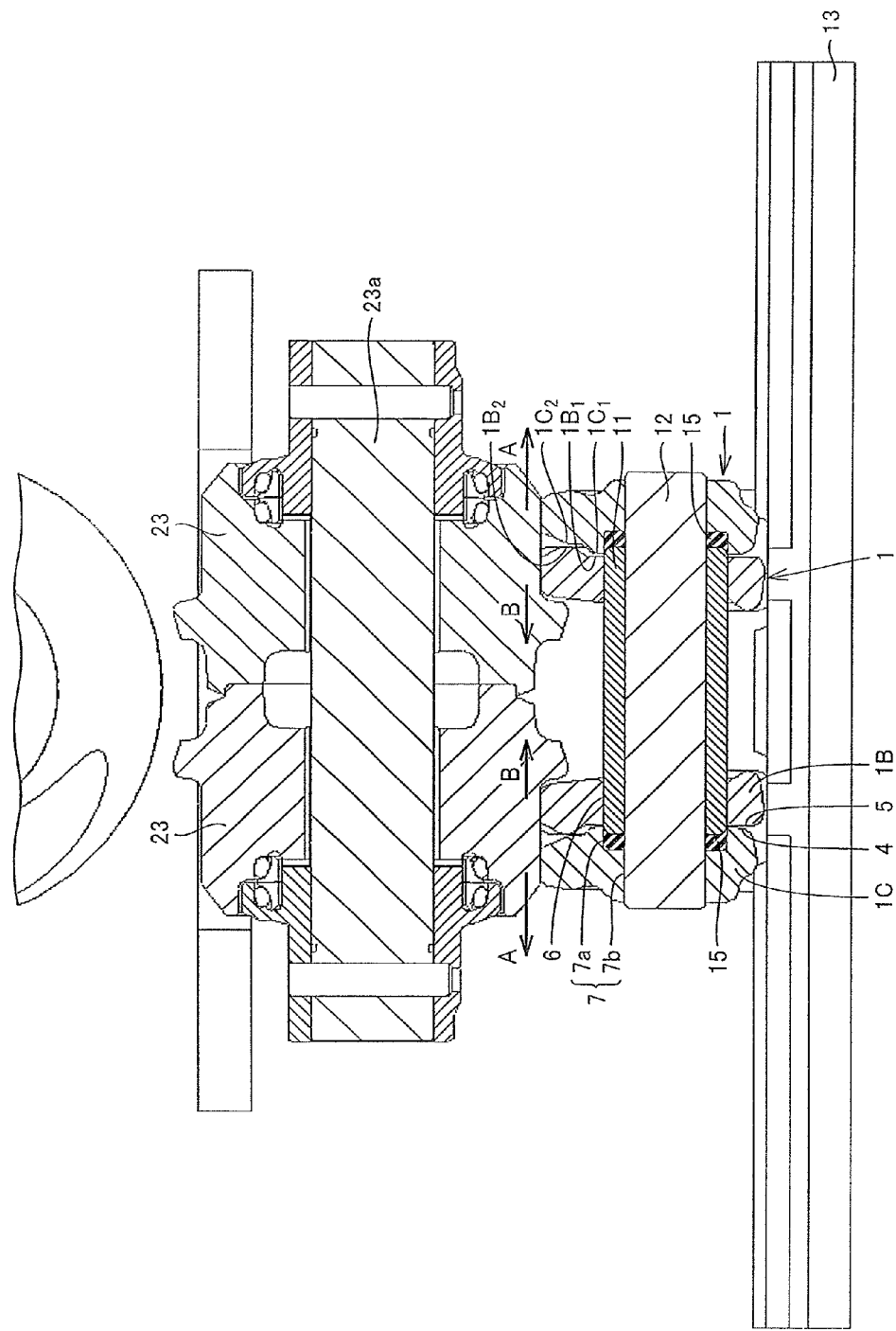
FIG. 6 is a schematic cross-sectional view taken along a line VI-VI in FIG. 5.

FIG. 6 is a schematic cross-sectional view taken along a line VI-VI in FIG. 5. Referring to FIG. 6, in a plurality of crawler belt links 1 arranged in one row, one end portion 1B of one crawler belt link 1 and the other end portion 1C of the other crawler belt link 1 are arranged to face each other. Specifically, one crawler belt link 1 and the other crawler belt link 1 are put together such that second side portion 5 at one end portion 1B of one crawler belt link 1 and first side portion 4 at the other end portion 1C of the other crawler belt link 1 face to each other. In other words, second side portion 5 of one end portion 1B and first side portion 4 of the other end portion 1C constitute a mating surface at which second side portion 5 and first side portion 4 face each other.

In this state, bushing hole 6 of one crawler belt link 1 and pin hole 7 of the other crawler belt link 1 are in communication with each other so as to be arranged concentrically with each other. Furthermore, one end portion 1B is disposed in inner crawler belt link 1 of crawler belt links 1 arranged in two rows (on the side indicated by an arrow B in FIG. 6) while the other end portion 1C is disposed in outer crawler belt link 1 of crawler belt links 1 arranged in two rows (on the side indicated by an arrow A in FIG. 6).

In the state where bushing hole 6 and pin hole 7 are in communication with each other, cylindrical bushing 11 is pressed-fitted into bushing hole 6 of one crawler belt link 1. Furthermore, the end of bushing 11 and seal member 15 are inserted into large-diameter portion 7a of pin hole 7 of the other crawler belt link 1. Coupling pin 12 is inserted into bushing 11, thereby inserted into bushing hole 6 of one crawler belt link 1 and also fixed in pin hole 7 of the other crawler belt link 1. Consequently, one crawler belt link 1 and the other crawler belt link 1 adjacent to each other in one row are coupled to each other.

In this way, crawler belt links 1 in each row are coupled to each other. Then, crawler belt link 1 in the first row is placed on one end side of one bushing 11 and coupling pin 12, and crawler belt link 1 in the second row is placed on the other end side, thereby causing a plurality of crawler belt links 1 arranged in two rows to be coupled to each other.

Then, the functions and effects of the present embodiment will be described.

According to crawler belt link 1 of the present embodiment, first outer circumferential portion $1B_2$ is located closer to second side portion 5 with respect to bushing hole surrounding portion $1B_1$, as shown in FIG. 4(D). Accordingly, second portion 3c of rail surface 3a can be enlarged toward second side portion 5 while maintaining the width between first side portion 4 and second side portion 5 of crawler belt link 1. Accordingly, it becomes possible to reduce the contact surface pressure in second portion 3c of rail surface 3a at the time when the rollers (track rollers 23, carrier rollers 24 and an idler wheel 22) and the like roll while coming into contact with rail surface 3a, thereby allowing suppression of wear of this second portion 3c. Therefore, the lifetime of crawler belt link 1 can be increased while degradation and chipping in rail surface 3a can be suppressed.

In addition, when the width between first side portion 4 and second side portion 5 of crawler belt link 1 is increased, the width of crawler belt link 1 needs to be increased in the outward direction (in the direction indicated by arrow A in FIG. 6) or in the inward direction (in the direction indicated by arrow B in FIG. 6) of crawler belt links 1 arranged in two rows, or increased both in the outward and inward directions thereof, as shown in FIG. 6. If the width of crawler belt link 1 is increased in the outward direction (in the direction indicated by arrow A), there occurs a problem that the width of one pair of roller guards (not shown) is increased to cause an increase in size of the apparatus. Also, if the width of crawler belt link 1 is increased in the inward direction (in the direction indicated by arrow B), there occurs a problem that crawler belt link 1 interferes with idler wheel 22 or driving wheel 21. On the other hand, in the present embodiment, the width of second portion 3c in rail surface 3a can be increased while maintaining the width between first side portion 4 and second side portion 5 of crawler belt link 1 as described above. Accordingly, the above-described problems do not occur.

Furthermore, according to crawler belt link 1 of the present embodiment, pin hole surrounding portion $1C_1$ is located closer to first side portion 4 with respect to second outer circumferential portion $1C_2$, as shown in FIG. 4(E). Thereby, a thickness W2b of pin hole surrounding portion $1C_1$ in the width direction can be increased toward first side portion 4. Therefore, the press-fit length of coupling pin 12 pressed-fitted into pin hole 7 can be increased, so that the force of crawler belt link 1 holding coupling pin 12 can be increased.

Furthermore, according to crawler belt link 1 of the present embodiment, as shown in FIG. 4(E), pin hole surrounding portion $1C_1$ is located closer to first side portion 4 with respect to second outer circumferential portion $1C_2$, and thereby formed in a convex shape with respect to second outer circumferential portion $1C_2$. Furthermore, as shown in FIG. 4(D), bushing hole surrounding portion $1B_1$ is located closer to first side portion 4 with respect to first outer circumferential portion $1B_2$, and thereby formed in a concave shape with respect to first outer circumferential portion $1B_2$. Therefore, as shown in FIG. 6, when second side portion 5 at one end portion 1B of one crawler belt link 1 and first side portion 4 at the other end portion 1C of the other crawler belt link 1 are arranged to face each other, convex-shaped pin hole surrounding portion $1C_1$ can be fitted into concave-shaped bushing hole surrounding portion $1B_1$.

Furthermore, according to crawler belt link 1 of the present embodiment, as shown in FIG. 4(D), width W1a of second surface 3 provided with second portion 3c of rail surface 3a is greater than width W1b of bushing hole surrounding portion $1B_1$ in portion P1 of bushing hole 6 located closest to second surface 3. Accordingly, width W1a of second surface 3 can be widely ensured while the width of second portion 3c in rail surface 3a can also be widely ensured.

Furthermore, according to crawler belt link 1 of the present embodiment, as shown in FIG. 4(A), width W1a of second surface 3 provided with second portion 3c of rail surface 3a and width W2a of second surface 3 provided with third portion 3d of rail surface 3a have the same dimension. Accordingly, second portion 3c and third portion 3d of rail surface 3a can be configured to have the same width. Therefore, it becomes possible to reduce the contact surface pressure in second portion 3c of rail surface 3a at the time when the roller and the like roll while coming into contact with rail surface 3a, thereby allowing suppression of wear of this second portion 3c.

Furthermore, according to crawler belt apparatus 10 having the above-described crawler belt link 1, wear of second portion 3c in rail surface 3a can be suppressed while maintaining the width between first side portion 4 and second side portion 5 of crawler belt link 1. Accordingly, it is not necessary to change the designs of other components such as a bushing, a pin and a track shoe plate for suppressing wear of rail surface 3a.

In addition, although through hole 2a used for inserting bolt member 14a as a track shoe plate attachment portion of crawler belt link 1 has been explained in the above description, the track shoe plate attachment portion is not limited to this through hole 2a, but may have any configuration as long as track shoe plate 13 can be attached. Furthermore, although bolt member 14a and nut member 14b each have been described as a track shoe plate attachment member, the track shoe plate attachment member is not limited thereto, but may have any configuration as long as track shoe plate 13 can be attached to crawler belt link 1.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

Reference Signs List 1 crawler belt link, 1A center portion, 1B one end portion, $1B_1$ bushing hole surrounding portion, $1B_2$ first outer circumferential portion, 1C the other end portion, $1C_1$ pin hole surrounding portion, $1C_2$ second outer circumferential portion, 2 first surface, 2a through hole, 3 second surface, 3a rail surface, 3b first portion, 3c second portion, 3d third portion, 4 first side portion, 5 second side portion, 6 bushing hole, 7 pin hole, 7a large-diameter portion, 7b small-diameter portion, 8 center through hole, 10 crawler belt apparatus, 11 bushing, 12 coupling pin, 13 track shoe plate, 14a bolt member, 14b nut member, 15 seal member, 20 lower traveling unit, 21 driving wheel, 22 idler wheel, 23 track roller, 24 carrier roller, 25 track frame, 26 revolving apparatus, 30 track-type work vehicle, 31 upper revolving unit, 31a cab, 31b engine compartment, 31c counter weight, 32 work implement.

The invention claimed is:

1. A crawler belt link including a first surface having a track shoe plate attachment portion, a second surface facing said first surface and having a rail surface, and first and second side portions extending in a direction that intersects said first and second surfaces and facing each other, said crawler belt link comprising:

a center portion provided with said track shoe plate attachment portion and having a first portion of said rail surface;

one end portion located on one end side of said center portion, having a second portion of said rail surface and disposed to be shifted toward said first side portion with respect to said center portion; and the other end portion located on the other end side of said center portion, having a third portion of said rail surface and disposed to be shifted toward said second side portion with respect to said center portion, said one end portion being provided with a first through hole extending through said one end portion from said first side portion toward said second side portion, said first through hole being a bushing hole, said other end portion being provided with a second through hole extending through said other end portion from said first side portion toward said second side portion and having a portion smaller in diameter than said first through hole, said one end portion including a first through hole surrounding portion surrounding said first through hole in said second side portion, and a first outer circumferential portion extending from an outer circumference of said first through hole surrounding portion to said second portion of said rail surface, and said first outer circumferential portion being located closer to said second side portion with respect to said first through hole surrounding portion where said first outer circumferential portion intersects said second portion of said rail surface.

2. The crawler belt link according to claim 1, wherein
said other end portion includes a second through hole surrounding portion surrounding said second through hole in said first side portion and a second outer circumferential portion extending from an outer circumference of said second through hole surrounding portion to said third portion of said rail surface, and said second through hole surrounding portion is located closer to said first side portion with respect to said second outer circumferential portion.

3. The crawler belt link according to claim 1, wherein a width between said first and second side portions in said second surface provided with said second portion of said rail surface is greater than a width between said first and second side portions in said first through hole surrounding portion in a portion of said first through hole located closest to said second surface.

4. The crawler belt link according to claim 1, wherein a width between said first and second side portions in said second surface provided with said second portion of said rail surface and a width between said first and second side portions in said second surface provided with said third portion of said rail surface have the same dimension.

5. A crawler belt apparatus comprising:
a plurality of said crawler belt links according to claim 1;
a bushing in a cylindrical shape inserted into said first through hole of one crawler belt link of one and the other crawler belt links included in said plurality of crawler belt links to be fixed to said one crawler belt link;
a coupling pin inserted into said first through hole of said one crawler belt link by being inserted into said bushing, and fixed to said other crawler belt link by being inserted into said second through hole of said other crawler belt link; and
a plurality of track shoe plates each attached to said track shoe plate attachment portion of each of said plurality of crawler belt links.

\* \* \* \* \*